United States Patent [19]
Uchiyama et al.

[11] Patent Number: 5,575,570
[45] Date of Patent: Nov. 19, 1996

[54] CAGE FOR ROLLING BEARING

[75] Inventors: Takahiko Uchiyama; Youichiro Sugimori; Toshimi Takajo; Michiharu Naka; Masao Yamamoto; Emiko Shiraishi; Atushi Yokouchi, all of Kanagawa, Japan

[73] Assignee: NSK Ltd., Tokyo, Japan

[21] Appl. No.: 499,375

[22] Filed: Jul. 7, 1995

[30] Foreign Application Priority Data

Jul. 8, 1994 [JP] Japan ..................................... 6-179705
Jan. 20, 1995 [JP] Japan ..................................... 7-024567

[51] Int. Cl.$^6$ ................................................. F16C 33/66
[52] U.S. Cl. ............................................ 384/470; 384/527
[58] Field of Search ..................................... 384/470, 527, 384/462, 523, 572; 252/12.2

[56] References Cited

U.S. PATENT DOCUMENTS 5,401,105   3/1995   Suzuki et al. ........................... 384/470

FOREIGN PATENT DOCUMENTS 61-6429    1/1986   Japan .
1-93623    4/1989   Japan .
6-249244   9/1995   Japan .

Primary Examiner—Thomas R. Hannon
Attorney, Agent, or Firm—Sughrue, Mion, Zinn, Macpeak & Seas

[57] ABSTRACT

A cage for a rolling bearing; the cage is obtained by molding a resin composition comprising 100 parts by weight of a heat-resistant and oil-resistant resin and from 5 to 100 parts by weight of a polyolefin and immersing the resulting molded article in a lubricating oil. Also is disclosed is a rolling bearing with the cage fitted therein and having been subjected to oil plating.

5 Claims, 3 Drawing Sheets

CAGE FOR ROLLING BEARING

FIELD OF THE INVENTION

This invention relates to a cage for various rolling bearings to be used under severe conditions. More particularly, it relates to a cage for a rolling bearing which is used either alone or in combination with a lubricating oil that is liquid at a temperature of use of the bearing or a semi-solid lubricant, such as grease, which improves lubricating properties of the bearing, which can be obtained by precision injection molding, and which exhibits well-balanced mechanical characteristics.

The present invention also relates to a rolling bearing of various kinds to be used under severe conditions in a part supporting a rotating member in hard disc drives (HDD), video tape recorders (VTR), digital audio tape recorders (DAT), laser beam printers (LBP). More particularly, it relates to a rolling bearing having improved lubricating properties, such as a torque or acoustic characteristics, extended durability, and excellent anticorrosion.

BACKGROUND OF THE INVENTION

As shown in FIG. 1, a rolling bearing is composed of a concentrically assembled set of inner race 2 forming inner raceway track 1 on its outer circumference and outer race 4 forming outer raceway track 3 on its inner circumference, with a plurality of rolling members 5 rotatably arranged between inner raceway track 1 and outer raceway track 3. Outer edge of a doughnut-shaped seal plate 6 is fixed to the inner surface of outer race 4 on both sides thereof so that the grease applied around rolling members 5 or dust generated may not leak outside or dust suspending outside may not enter in the vicinities of the rolling members 5.

Plural rolling members 5 are rotatably held by cage 7 shown in FIG. 2. Cage 7 of this type is made of an integrally injection-molded synthetic resin. Cage 7 integrally consists of annular main body 8 having a plurality of holding parts 9 on one side thereof. Each holding part 9 is formed by a pair of elastic parts 10 spaced from each other. The opposing faces of a pair of elastic parts 10 have a concave curved surface, thereby making a spherical form or a column form. Each rolling member 5 is pressed into the space between a pair of elastic parts 10 while elastically widening the interval between the pair of elastic parts 10 and is thereby rotatably held by each holding part 9.

Cage 7 is generally made of a metal or a synthetic resin which can be injection molded, such as a polyamide resin, a polyacetal resin or a polybutylene terephthalate resin, or a synthetic resin composition comprising such a synthetic resin and glass fiber, carbon fiber, organic fiber, etc.

Since cage 7 only functions to hold rolling members 5, lubrication of a rolling bearing is achieved by using a large amount of a lubricating oil or a semi-solid lubricant, such as grease. However, when, in particular, a semi-solid lubricant such as grease is used in case where a large amount of a lubricating oil cannot be used, resistance to stirring of the lubricant increases the torque required for rotating a shaft, etc. supported by the bearing. Besides, the torque fluctuation increases with rotation.

In order to overcome these problems, a rolling bearing in which cage 7 itself has a lubricating function has been proposed. For example, JP-A-61-6429 (the term "JP-A" as used herein means an "unexamined published Japanese patent application") discloses a bearing cage comprising a porous polyamide-imide resin formed by compression molding and impregnated with a fluorinated oil. JP-A-1-93623 discloses a cage which is produced by injection molding an oil-containing plastic composition comprising a matrix resin and an oil-containing binder to obtain a cage precursor and then impregnating the cage precursor with a lubricating oil by immersion.

Since the lubricating oil incorporated into the cage of these rolling bearings slowly oozes from the surface of the cage with rotation of the bearing, the bearing exerts lubricating action for a long time. However, the conventional rolling bearings do not always satisfy the demands for lubrication in the initial stage of rotation or at a low speed of rotation.

Further, the cage of JP-A-61-6429 oozes the lubricating oil soon due to its porosity and loses the lubricating action in the relatively early stage of use.

On the other hand, as in JP-A-1-93623, when an oil-containing plastic composition having an oil content of about 10% by weight is injection molded into such a shape as a bearing cage that is apt to cause weld lines, the lubricating oil tends to be separated from the matrix resin while the composition is flowing in the mold, and the resulting molded article suffers from considerable reduction in mechanical characteristics in the vicinities of the weld lines.

Besides, taking affinity to the resin matrix into consideration, it is difficult in the above techniques to use a lubricating oil containing additives, such as a rust inhibitor, for the purpose of imparting not only lubricity but other properties, such as anticorrosion, to the rolling bearing.

SUMMARY OF THE INVENTION

An object of the present invention is to provide a lubricating oil-impregnated cage for a rolling bearing which is economically prepared from a resin composition having improved affinity to a lubricating oil so that it is easily impregnated with a lubricating oil and retains a sufficient amount of the lubricating oil and therefore supplies the lubricating oil to the bearing in a stable manner and exhibits satisfactory mechanical characteristics.

Another object of the present invention is to provide a rolling bearing which maintains lubricating properties for an extended period of time, exhibits excellent lubricating properties in the initial stage of rotation or at a low speed of rotation, has a low torque with little torque fluctuation, and may be endowed with characteristics other than lubricating properties, such as anticorrosion.

The above objects of the present invention are accomplished by adding a polyolefin having high affinity to a lubricating oil to a molding composition for obtaining a cage.

The present invention relates to a cage for a rolling bearing obtained by molding a resin composition comprising 100 parts by weight of a heat-resistant and oil-resistant resin and from 5 to 100 parts by weight of a polyolefin into a shape of a cage and then immersing the molded article in a lubricating oil. The total amount of the heat-resistant and oil-resistant resin and the polyolefin is preferably in an amount of 50 to 100% by weight based on the resin composition.

In a preferred embodiment of the present invention, the heat-resistant and oil-resistant resin is a polyamide resin.

In another preferred embodiment of the present invention, the polyolefin is at least one of polyethylene, polypropylene, poly-1-butene, poly-4-methyl-1-pentene, and a copolymer comprising monomer units composing these homopolymers.

In a still another preferred embodiment of the present invention, the immersion of the molded article in a lubricating oil is carried out so that the molded article picks up from 0.2 to 15 parts by weight of the lubricating oil per 100 parts by weight of the molded article.

The present invention also relates to a rolling bearing having fitted therein a cage, the cage being obtained by molding a resin composition comprising a heat-resistant and oil-resistant resin and a polyolefin into a shape of a cage and then immersing the molded article in a lubricating oil, and then having been subjected to oil plating.

DETAILED DESCRIPTION OF THE INVENTION

Figure 1:
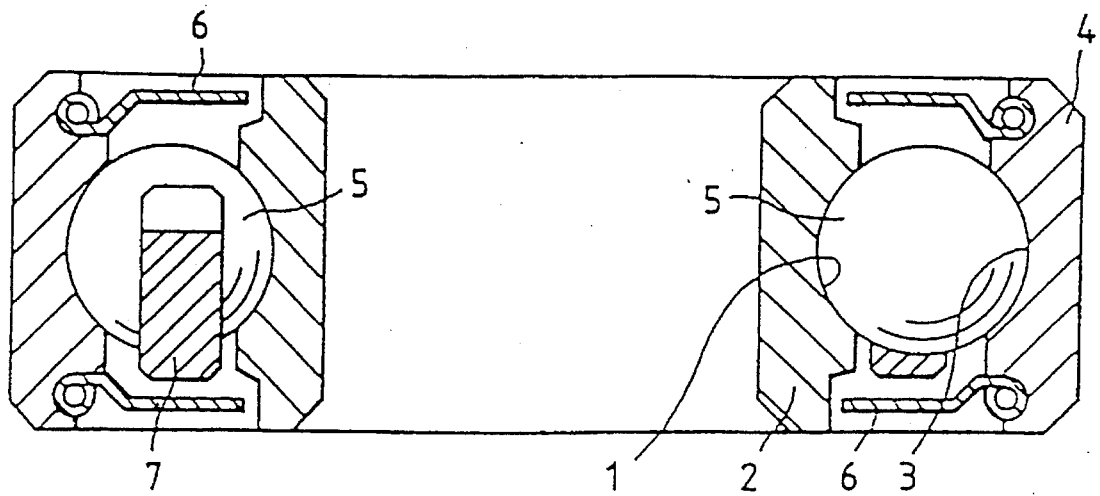
FIG. 1 is a cross section of a rolling bearing.

In the present invention, a molded article obtained from a resin composition comprising a heat-resistant and oil-resistant resin and a polyolefin is immersed in a lubricating oil to provide a cage impregnated with a given amount of the lubricating oil.

Since the resin composition contains a polyolefin having high affinity to a lubricating oil, with an increase of the amount of a lubricating oil contained in the molded article, the molded article shows a high oil retention. Accordingly, the lubricating oil is supplied to the rotating part of the rolling members in a stable manner for a prolonged period of time. The rolling bearing using the cage of the present invention requires a reduced torque for rotation and shows little torque fluctuation.

The heat-resistant and oil-resistant resin serving as a matrix and a polyolefin have different melt viscosity at the shear rate during injection molding. This difference in melt viscosity increases the aspect ratio of the polyolefin dispersed in the heat-resistant and oil-resistant resin matrix, thereby bringing about an improvement in oil absorption. In particular, as the melt viscosity of the polyolefin becomes lower than that of the heat-resistant and oil-resistant resin, the ratio of occupation by the polyolefin in the surface portion of a molded article increases to impart the characteristics of the polyolefin to the surface of the molded article thereby further improving the oil absorbability.

Since the cage is furnished with a lubricating oil through immersion after molding, the molded article suffers from no weld line and therefore exhibits excellent mechanical strength.

The rolling bearing in which the above-mentioned cage is fitted is subjected to oil plating so that a given amount of a lubricating oil is uniformly adhered to all the surface of the bearing. Therefore, even when oozing of a lubricating oil from the cage is insufficient in the initial stage of rotation or at a low speed of rotation, lubrication is assured by the lubricating oil adhered to the surface of the bearing. It is possible to impart not only lubricating properties but other characteristics to the bearing by adding additives to the lubricating oil for oil plating. For example, rust generation often observed particularly with rolling bearings used in high temperatures can be prevented by using a lubricating oil containing a rust inhibitor for oil plating.

The matrix resin which can be used in the present invention preferably includes those excellent in heat resistance and oil resistance in order to form and retain the shape of a cage. The number-average molecular weight of the heat-resistant and oil-resistant resin is generally from 10,000 to 100,000. Examples of suitable heat-resistant and oil-resistant resins are polyamide resins, polyacetal resins, polyethylene terephthalate, polybutylene terephthalate, polycarbonate resins, polyphenylene sulfide resins, polyether sulfone resins, polyether-imide resins, polyamide-imide resins, and polyether ether ketones. Preferred of them are polyamide resins for their inexpensiveness and ease of property modification by a polyolefin as well as satisfactory heat and oil resistance. The number-average molecular weight of the polyamide resin is generally from 13,000 to 30,000.

The polyolefin which can be used in the present invention is dispersed in the heat-resistant and oil-resistant resin matrix to serve to retain a lubricating oil. Examples of suitable polyolefins are polyethylene, polypropylene, poly-1-butene, poly-4-methyl-1-pentene, copolymers comprising monomer units composing these homopolymers, and mixtures of two or more thereof. The number-average molecular weight of the polyolefin is generally from 10,000 to 4,000,000.

In case where the polyolefin fails to produce excellent effects to improve mechanical strength when merely melt-kneaded with the matrix resin, a modified polyolefin obtained by grafting an appropriate functional group to the polyolefin may be used, or such a graft-modified polyolefin or an appropriate compatibilizer may be added to the resin composition to improve the compatibility between the matrix resin and the polyolefin.

The cage for a rolling bearing according to the present invention is obtained from a resin composition prepared by mixing the above-mentioned heat-resistant and oil-resistant resin and polyolefin.

As the difference increases between the heat-resistant and oil-resistant resin and the polyolefin in melt viscosity at the shear rate during injection molding, the aspect ratio of the polyolefin dispersed in the heat-resistant and oil-resistant resin increases to improve the oil absorbability. The melt viscosity of the matrix resin or the polyolefin is not particularly limited. It is the difference between them that is important, and the greater the difference, the better. In particular, as the melt viscosity of the polyolefin becomes lower, the ratio of occupation by the polyolefin in the surface portion of a molded article increases to impart the characteristics of the polyolefin to the surface of the molded article thereby further improving the oil absorbability.

The polyolefin is used in an amount of from 5 to 100 parts by weight, preferably from 10 to 80 parts by weight, per 100 parts of the heat-resistant and oil-resistant resin. If the amount of the polyolefin is less than 5 parts by weight, the resulting cage does not have sufficient oil absorbability. If the amount of the polyolefin exceeds 100 parts by weight, not only are impaired the heat resistance and mechanical characteristics of the cage but also the polyolefin is swollen with a lubricating oil when immersed in a lubricating oil, resulting in considerable reduction in dimensional precision.

If desired, in order to enhance the mechanical strength of the cage, the resin composition as a molding material may contain organic or inorganic fibrous fillers in such a proportion that will not impair lubricating performance. Usable fibrous fillers include glass fiber, carbon fiber, aramid fibers, potassium titanate fiber, alumina fiber, silicon nitride fiber, and stainless steel fiber. Preferred among them are glass fiber, carbon fiber, and highly heat-resistant aramid fibers exemplified by Kevlar fiber and Nomex fiber both manufactured by E. I. du Pont de Nemours & Co., Inc. and Technola and Conex both manufactured by Teijin Ltd. The amount of the fibrous filler to be added is preferably not more than 150 parts by weight per 100 parts by weight of the total amount of the heat-resistant and oil-resistant resin and the polyolefin. If it exceeds 150 parts by weight, the resulting resin composition is difficult to melt-knead, failing to prepare a satisfactory molding material.

In addition to the above-described fibrous fillers, the resin composition may further contain appropriate amounts of other organic or inorganic fillers or various additives, such as antioxidants, ultraviolet absorbers, light protecting agents, heat stabilizers, flame retardants, antioxidants, peroxide decomposing agents, fluidity modifiers, anti-block additives, parting agents, nucleating agents, plasticizers, solid lubricants, pigments, dyes, and the like.

The resin components and fillers and various additives used if desired can be melt-kneaded individually or they may preliminarily be mixed together by means of a mixing machine, e.g., a Henschel mixer, a tumble mixer, a ribbon mixer, etc., and fed to a melt-kneading machine. Melt-kneading machines to be used include a single-screw extruder, a twin-screw extruder, a mixing roll, a pressure kneader, and a Brabender Plastograph. The melt-kneading temperature is appropriately decided so that each component except fibrous fillers may sufficiently be melted without being decomposed.

The cage of the present invention is produced by molding the above-mentioned resin composition to obtain a molded article having the shape of a cage and immersing the molding article in a lubricating oil.

The molding is carried out by general injection molding using, for example, an in-line screw type injection molding machine.

The lubricating oil which can be used for immersion is not particularly limited and includes paraffinic mineral oils, naphthenic mineral oils, and synthetic lubricating oils, such as hydrocarbon oils (e.g., poly α-olefins, polybutene, and alkyl aromatic oils), polyalkylene glycols, diesters, hindered esters, neopentyl glycol esters, trimethylol esters, pentaerythritol esters, dipentaerythritol esters, aromatic esters, silicone compounds (e.g., silicone oils and silicic esters), fluorine-containing oils (e.g., chlorofluorocarbons, perfluoropolyethers, and fluoroesters), phenyl ethers, and phosphoric esters. Preferred are mineral oils easily absorbed by polyolefins or synthetic lubricating oils, such as hydrocarbon oils, fatty acid esters, polyalkylene glycols, phenyl ethers, and phosphoric esters. Diester type, hindered ester type and ether type synthetic resin oils are particularly preferred.

The lubricating oil is infiltrated into the cage-shaped molded article to give an oil content of from 0.2 to 15% by weight, preferably 1 to 10% by weight. The term "oil content" as used herein means the percentage of the weight of the oil infiltrated based on the dry weight of a molded article before being impregnated with the oil. If the oil content is less than 0.2% by weight, the lubricating oil content of the cage is insufficient absolutely. It follows that the lubricating oil to be supplied to the rotating part of the rolling members will soon be exhausted, and the bearing has short duration. Even if the oil content exceeds 15% by weight, not only is obtained no further improvement of lubrication but the dimensional precision and mechanical characteristics of the cage are reduced. Besides, impregnation with such a large amount of a lubricating oil takes time to reduce production efficiency, causing an increase in cost.

While not limiting, the kinetic viscosity of the lubricating oil to be used for impregnation preferably ranges from 10 to 150 mm$^2$/s, still preferably 10 to 130 mm$^2$/s, at 40° C. A lubricating oil having as a low kinetic viscosity as 10 mm$^2$/s or less at 40° C. shows a high rate of infiltration into a cage to afford a high oil content but exhibits poor retention (ready to ooze out) and will soon be exhausted. In using a lubricating oil having as a high kinetic viscosity as 150 mm$^2$/s or more, not only is it difficult to infiltrate the oil into the polyolefin constituting the cage but the bearing using the resulting cage requires an increased torque for rotation.

The lubricating oil content can be increased by heating the lubricating oil to be infiltrated to a temperature not exceeding the melting point of the heat-resistant and oil-resistant resin and/or by extending the time of immersion. It should be noted, however, that too a high temperature of the lubricating oil causes thermal deformation of the cage. Accordingly, it is preferable to conduct the immersion treatment with the temperature of the lubricating oil set at a temperature lower than the melting point of the heat-resistant and oil-resistant resin by at least about 50° C.

If desired, the lubricating oil to be infiltrated into the cage may contain additives, such as antioxidants, rust inhibitors, extreme pressure additives, oiliness improvers, viscosity index modifiers, and anti-wear agents, as long as the effects of the present invention are not impaired.

The rolling bearing according to the present invention will be described below in detail.

The cage to be fitted into the bearing of the present invention is obtained by molding a resin composition comprising a heat-resistant and oil-resistant resin and a polyolefin into a molded article having a desired shape of a cage and immersing the resulting molded article in a lubricating oil.

The rolling bearing according to the present invention is obtained by fitting the thus produced lubricating oil-impregnated cage into the body of a bearing and then subjecting the bearing to oil plating.

The lubricating oil to be used for oil plating is not particularly limited. It may be the same as or different from that used for impregnation. At least one lubricating oil selected from those enumerated above for impregnation may be used.

Similarly to the lubricating oil for impregnation, the lubricating oil for oil plating may contain additives, such as antioxidants, rust inhibitors, extreme pressure additives, oiliness improvers, viscosity index modifiers, and anti-wear agents.

The manner of oil plating is not particularly restricted. For example, oil plating can be carried out by method (1) in which a rolling bearing with a cage fitted therein is dipped in a volatile solvent having dissolved therein a lubricating oil and pulled up, and the volatile solvent is removed by evaporation, method (2) in which a rolling bearing with a cage fitted therein is dipped in a low volatile solvent, such as kerosene, having dissolved therein a lubricating oil, pulled up, and centrifuged to adjust the oil coverage (the amount of the oil adhered to the surface of a bearing), or method (3) in which a lubricating oil or a solvent-diluted lubricating oil is directly sprayed onto a bearing with a cage fitted therein. Methods (1) and (2) are recommended because a lubricating oil can be applied uniformly onto all the surface of a rolling bearing; the coverage of the lubricating oil is constant; and the treatment efficiency is high.

The oil coverage by oil plating is not particularly limited as long as the lubricating properties in the initial stage of rotation or at a low speed of rotation are improved. For instance, for a miniature ball bearing having an inner diameter of 5 mm, an outer diameter of 13 mm, and a width of 4 mm, the oil coverage is generally from 1 to 15 mg. The oil coverage can be obtained by measuring the amount increased after the oil plating treatment by a weighing machine.

The present invention will now be illustrated in greater detail with reference to Examples, but it should be understood that the present invention is not construed as being limited thereto. Unless otherwise indicated, all the percents are given by weight.

EXAMPLES 1 TO 12 AND COMPARATIVE EXAMPLES 1 TO 5

Nylon 66 (PA66, "Leona 1300S" produced by Asahi Chemical Industry Co., Ltd.) as a heat-resistant and oil-resistant resin, a polyolefin resin selected from low-viscosity high-density polyethylene (L-HDPE, "Hizex 1300J" produced by Mitsui Petrochemical Industries, Ltd.), middle-viscosity high-density polyethylene (M-HDPE, "Hizex 2200J" produced by Mitsui Petrochemical Industries, Ltd.), high-viscosity high-density polyethylene (H-HDPE, "Hizex 5000H" produced by Mitsui Petrochemical Industries, Ltd.), low-viscosity polypropylene (L-PP, "Hipol J700" produced by Mitsui Petrochemical Industries, Ltd.) and middle-viscosity polypropylene (M-PP, "Hipol J300" produced by Mitsui Petrochemical Industries, Ltd.), a compatibilizer selected from maleic anhydride-grafted polyethylene (MAH-PE) and maleic anhydride-grafted polypropylene (MAH-PP), and, as a fibrous filler, aminosilane coupling agent-treated glass chopped strands (GF) of 13 μm in diameter and 3 mm in length were premixed in a Henschel mixer (manufactured by Mitsui Miike Machinery Co., Ltd.) at a mixing ratio shown in Table 1 below. The premix was melt-kneaded in a twin-screw extruder PCM-30 (manufactured by Ikegai Corporation) and extruded to prepare test pieces.

Tensile characteristics and oil absorption characteristics of the test pieces were evaluated in accordance with the following test methods. The results obtained are shown in Tables 1 and 2 below.

1) Tensile Test

Tensile strength and elongation were measured using type I specimens specified in ASTM D-638 under the following conditions:

Speed of testing: 20 mm/min

Distance between grips: 115 mm

2) Lubricating Oil Impregnation Test

Lubricating oil absorbability of a specimen was evaluated using a lubricating oil impregnation tester manufactured by NSK Ltd. under the following conditions:

Specimen shape: disc (diameter, 30 mm; thickness, 1 mm)

Lubricating oil:
1) paraffinic mineral oil having a kinetic viscosity of 68 mm$^2$/s at 40° C.
2) poly α-olefin-based synthetic lubricating oil (hereinafter abbreviated as PAO) having a kinetic viscosity of 46 mm$^2$/s at 40° C.
3) di-2-ethylhexyl sebacate-based synthetic lubricating oil (hereinafter abbreviated as DOS) having a kinetic viscosity of 12 mm$^2$/s at 40° C.
4) dialkyl diphenyl ether type synthetic lubricating oil (hereinafter abbreviated as DAPE) having a kinetic viscosity of 22 mm$^2$/s at 40° C.

Oil temperature: 60° C. or 160° C.

Immersion time: 6 hrs

After oil immersion, the oil content of the specimen was calculated from the following equation:

Oil content (wt %)=(Weight of specimen after immersion−Weight of specimen after absolute drying)/(Weight of specimen after absolute drying)×100

Weight of specimen after immersion: The weight measured after washing the specimen subjected to the immersion with a volatile solvent such as n-hexane, and drying the washed specimen.

Weight of specimen after absolute drying: The weight measured after drying a specimen in a vacuum dryer or dehumidifying dryer so that the water content of the specimen was reduced to 0.05% by weight or less.

TABLE 1

| Example No. | Mixing Ratio (wt %) | | | | | | | | | Tensile Characteristics | |
|---|---|---|---|---|---|---|---|---|---|---|---|
| | PA66 | L-HDPE | M-HDPE | H-HDPE | L-PP | M-PP | MAH-PE | MAH-PP | GF | Strength (MPa) | Elongation (%) |
| Example 1 | 80 | 15 | | | | | 5 | | | 71 | 17 |
| Example 2 | 70 | 23 | | | | | 7 | | | 63 | 19 |
| Example 3 | 60 | 30 | | | | | 10 | | | 55 | 20 |
| Example 4 | 70 | | 23 | | | | 7 | | | 63 | 18 |
| Example 5 | 70 | | | 23 | | | 7 | | | 62 | 18 |
| Example 6 | 80 | | | | 15 | | | 5 | | 72 | 18 |
| Example 7 | 70 | | | | 23 | | | 7 | | 65 | 19 |
| Example 8 | 60 | | | | 30 | | | 10 | | 56 | 21 |
| Example 9 | 70 | | | | | 23 | | 7 | | 64 | 20 |
| Example 10 | 70 | | | | 30 | | | | | 51 | 13 |
| Example 11 | 63 | | | | 20.7 | | | 6.3 | 10 | 90 | 9 |
| Example 12 | 49 | | | | 16.1 | | | 4.9 | 30 | 156 | 7 |
| Comparative Example 1 | 95 | | | | 3 | | | 2 | | 165 | 6 |

TABLE 1-continued

| Example No. | Mixing Ratio (wt %) | | | | | | | | | Tensile Characteristics | |
|---|---|---|---|---|---|---|---|---|---|---|---|
| | PA66 | L-HDPE | M-HDPE | H-HDPE | L-PP | M-PP | MAH-PE | MAH-PP | GF | Strength (MPa) | Elongation (%) |
| Comparative Example 2 | 40 | | | | 40 | | | 20 | | 42 | 27 |
| Comparative Example 3 | 100 | | | | | | | | | 85 | 20 |
| Comparative Example 4 | 90 | | | | | | | | 10 | 100 | 8 |
| Comparative Example 5 | 70 | | | | | | | | 30 | 170 | 5 |

TABLE 2

| Example No. | Oil Content (wt %) | | | | | | | |
|---|---|---|---|---|---|---|---|---|
| | Mineral Oil | | PAO | | DOS | | DAPE | |
| | 60° C. | 160° C. | 60° C. | 160° C. | 60° C. | 160° C. | 60° C. | 160° C. |
| Example 1 | | | | | 0.67 | 2.1 | | |
| Example 2 | | | | | 0.76 | 5.4 | | |
| Example 3 | | | | | 0.82 | 7.6 | | |
| Example 4 | | | | | 0.59 | 3.7 | | |
| Example 5 | | | | | 0.70 | 4.4 | | |
| Example 6 | | | | | 0.37 | 1.5 | | |
| Example 7 | 0.49 | 5.0 | 0.33 | 3.9 | 0.45 | 4.6 | 0.26 | 2.8 |
| Example 8 | | | | | 0.55 | 6.3 | | |
| Example 9 | | | | | 0.38 | 3.2 | | |
| Example 10 | | | | | 0.48 | 5.2 | | |
| Example 11 | | | | | 0.44 | 4.8 | | |
| Example 12 | | | | | 0.38 | 3.7 | | |
| Comparative Example 1 | | | | | 0.16 | 0.8 | | |
| Comparative Example 2 | | | | | 0.75 | 9.8 | | |
| Comparative Example 3 | | | | | 0.05 | 0.4 | | |
| Comparative Example 4 | | | | | 0.04 | 0.3 | | |
| Comparative Example 5 | | | | | 0.03 | 0.2 | | |

It is seen from Tables 1 and 2 that the resin compositions of Examples 1 to 12 are excellent in tensile characteristics as well as lubricating oil absorbability.

Figure 3:
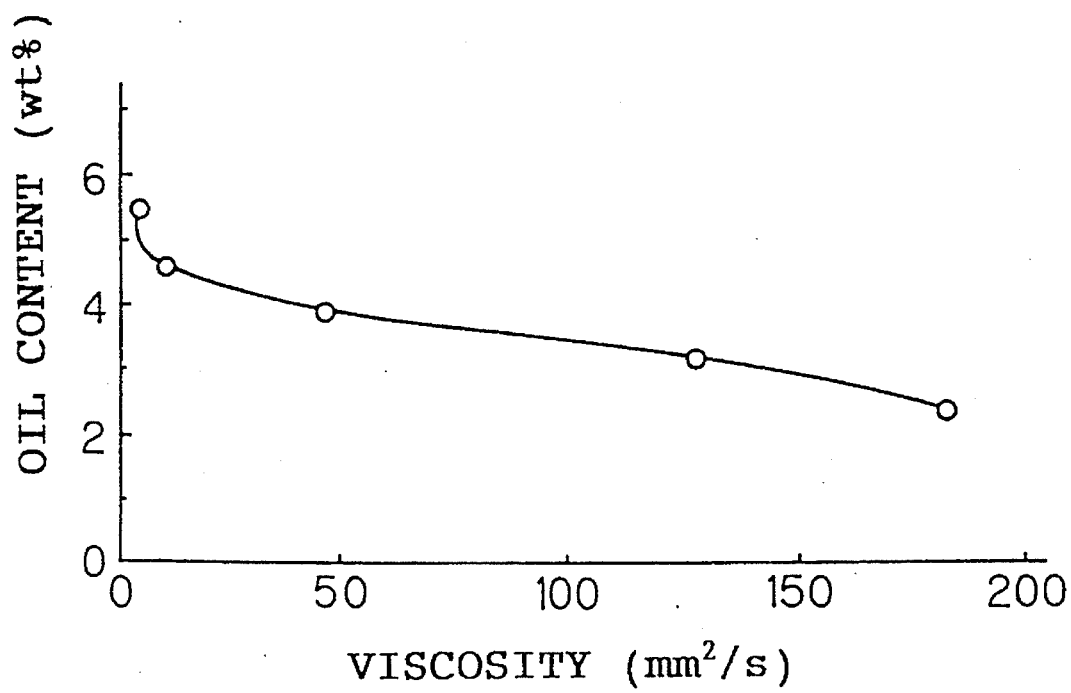
FIG. 3 is a graph showing the relationship between the kinetic viscosity of a lubricating oil and the oil content of a resin composition.

Further, in order to examine change of oil content with change of viscosity of a lubricating oil, the specimen of the resin composition of Example 7 was tested in the same manner as in the impregnation test described above except for using PAO having a kinetic viscosity of 4 mm²/s, 10 mm²/s, 46 mm²/s, 127 mm²/s or 181 mm²/s at 40° C. The temperature of the lubricating oil was 160° C. The results obtained are depicted in FIG. 3.

Figure 4:
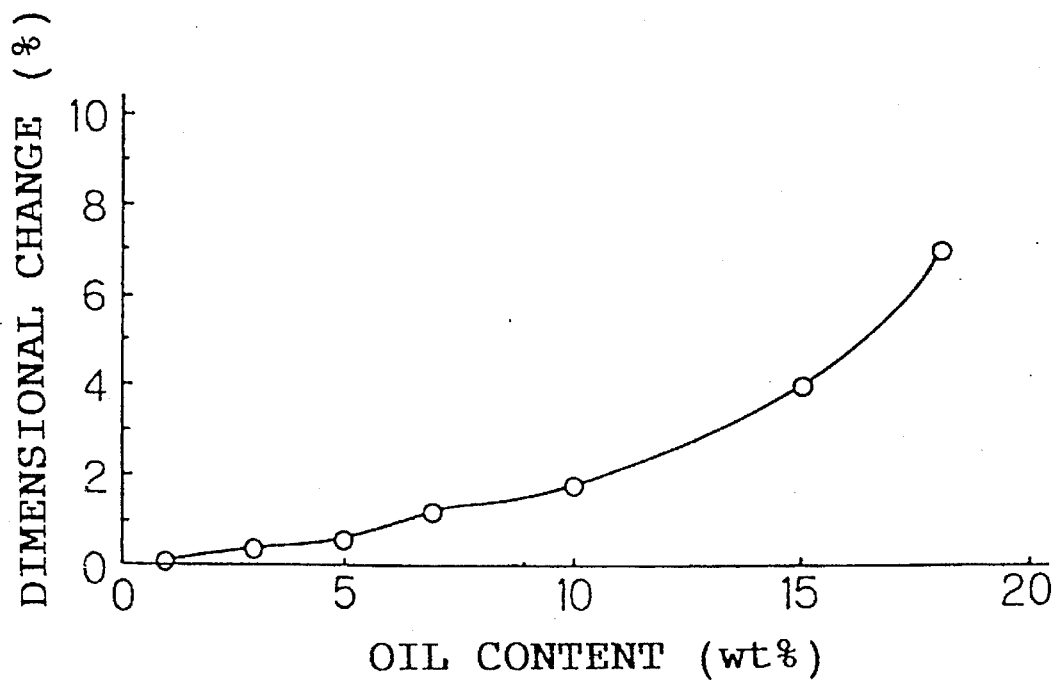
FIG. 4 is a graph showing the change in dimension of a resin composition depending on its oil content.

Furthermore, in order to examine dimensional change with an increase in oil content, the specimen of the resin composition of Example 7 was tested in the same manner as in the impregnation test described above except for using DOS having a kinetic viscosity of 12 mm²/s at 40° C. and varying the immersion time. The temperature of the lubricating oil was 160° C. The dimensional change due to immersion was calculated from the following equation. The results obtained are depicted in FIG. 4.

Dimensional change (%) = (Diameter of specimen after immersion − Diameter of specimen after absolute drying)/(Diameter of specimen after absolute drying) × 100

EXAMPLES 13 TO 22 AND COMPARATIVE EXAMPLES 6 TO 8

Figure 2:
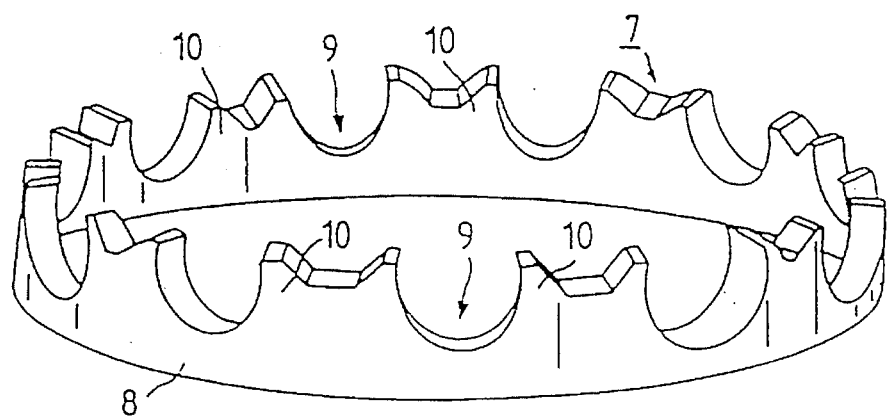
FIG. 2 is a perspective view of the cage of the rolling bearing shown in FIG. 1.

A crown-shaped cage shown in FIGS. 1 and 2 was prepared according to the following description and fitted into a miniature ball bearing having an inner diameter of 5 mm, an outer diameter of 13 mm, and a width of 4 mm. A rotation test of the resulting ball bearing was carried out under the following conditions to verify the effects of the cage of the present invention. The results of the test are shown in Table 3 below.

Rotation Test Conditions
Number of rotation of inner race: 5000 rpm
Thrust load: 3 kgf
Atmosphere: 80° C.

Example 13

A resin composition consisting of 70% of nylon 66, 23% of low-viscosity high-density polyethylene, and 7% of maleic anhydride-grafted polyethylene was injection molded, and the resulting molded article was impregnated with 4.8%, based on the molded article, of PAO having a kinetic viscosity of 46 mm$^2$/s at 40° C.

Example 14

The same molded article as prepared in Example 13 was impregnated with 5.2%, based on the molded article, of PAO having a kinetic viscosity of 4 mm$^2$/s at 40° C.

Example 15

The same molded article as prepared in Example 13 was impregnated with 4.9%, based on the molded article, of PAO having a kinetic viscosity of 10 mm$^2$/s at 40° C.

Example 16

The same molded article as prepared in Example 13 was impregnated with 4.8%, based on the molded article, of PAO having a kinetic viscosity of 46 mm$^2$/s at 40° C.

Example 17

The same molded article as prepared in Example 13 was impregnated with 3.9%, based on the molded article, of PAO having a kinetic viscosity of 127 mm$^2$/s at 40° C.

Example 18

The same molded article as prepared in Example 13 was impregnated with 4.2%, based on the molded article, of PAO having a kinetic viscosity of 181 mm$^2$/s at 40° C.

Example 19

The same molded article as prepared in Example 13 was impregnated with 0.58%, based on the molded article, of DOS having a kinetic viscosity of 12 mm$^2$/s at 40° C.

Example 20

The same molded article as prepared in Example 13 was impregnated with 1.2%, based on the molded article, of DOS having a kinetic viscosity of 12 mm$^2$/s at 40° C.

Example 21

The same molded article as prepared in Example 13 was impregnated with 4.6%, based on the molded article, of DOS having a kinetic viscosity of 12 mm$^2$/s at 40° C.

Example 22

The same molded article as prepared in Example 13 was impregnated with 4.3%, based on the molded article, of DAPE having a kinetic viscosity of 22 mm$^2$/s at 40° C.

Example 23

The same molded article as prepared in Example 13 was impregnated with 0.25%, based on the molded article, of DOS having a kinetic viscosity of 12 mm$^2$/s at 40° C.

Comparative Example 6

The same molded article as prepared in Example 13 was impregnated with 0.13%, based on the molded article, of DOS having a kinetic viscosity of 12 mm$^2$/s at 40° C.

Comparative Example 7

Nylon 66 was injection molded to obtain a cage (the resulting cage was fitted into a ball bearing as such).

Comparative Example 8

Nylon 66 was injection molded to obtain a cage, and the resulting cage was fitted into a ball bearing to which 15 mg of lithium soap grease had been applied.

Evaluation

Each cage was evaluated in terms of initial torque, oil content after 1000 hours' rotation and seizing time.

Initial Torque

The value measured after 10 minutes from the start of rotation, at which the torque reached a substantially steady state, was taken as an initial torque.

Oil Content After 1000 hours' Rotation

It was calculated according to the following equation:

Oil Content (% by weight)=((Weight of a cage after 1000 hours' rotation–Weight of a cage after absolute drying)/Weight of a cage after absolute drying)×100.

Weight of cage after absolute drying: The weight measured after drying a cage before the rotation test in a vacuum dryer or dehumidifying dryer so that the water content of the cage was reduced to 0.05% by weight or less.

Seizing Time (hour)

The time required until the torque exceeds three times the initial torque is taken as a seizing time.

TABLE 3

| Example No. | Initial Torque (gf · cm) | Oil Content After 1000 hrs' Rotation (wt %) | Seizing Time (hr) |
|---|---|---|---|
| Example 13 | 1.08 | 3.20 | 9750 |
| Example 14 | 0.95 | 2.60 | 5650 |
| Example 15 | 1.01 | 3.92 | 7220 |
| Example 16 | 1.12 | 4.30 | 8920 |
| Example 17 | 1.45 | 3.50 | ≧10000 |
| Example 18 | 2.20 | 3.72 | ≧10000 |
| Example 19 | 0.98 | 0.41 | 4720 |
| Example 20 | 1.03 | 0.92 | 9450 |
| Example 21 | 1.00 | 4.10 | ≧10000 |
| Example 22 | 1.01 | 3.80 | ≧10000 |
| Example 23 | 1.19 | 0.19 | 2650 |
| Comparative Example 6 | 1.30 | 0.10 | 650 |
| Comparative Example 7 | ≧20 | — | ≦4 |
| Comparative Example 8 | 5.90 | — | 3420 |

Since all the cages of Examples 13 to 23 have not only a high content of a lubricating oil but maintain the oil content at a high retention, as demonstrated in Table 3, the ball bearings using these cages are furnished with a lubricating oil oozed out from the respective cage for an extended period of time and therefore show satisfactory lubrication without using grease, hardly undergo seizing, and thereby have a greatly prolonged life. Increase in torque attributed to resistance to stirring of grease was inhibited in the ball bearings of Examples 13 to 23 because of no grease applied.

EXAMPLES 24 TO 29 AND COMPARATIVE EXAMPLES 9 TO 13

A crown-shaped cage shown in FIGS. 1 and 2 was prepared according to the following description and fitted into a miniature ball bearing having an inner diameter of 5 mm, an outer diameter of 13 mm, and a width of 4 mm. In Examples 24 to 29 and Comparative Examples 9 and 13, the resulting ball bearing was subjected to oil plating according to the following description. The lubricating oil used in the oil plating contained 4% of tricresyl phosphate and 6% of calcium sulfonate as rust inhibitors. In order to verify the effects of the rolling bearing of the present invention, a rotation test and an anticorrosion test of the resulting ball bearing were carried out under the following conditions. The results obtained are shown in Table 4 below.

1) Rotation Test
Rotation Conditions:

Number of rotation of inner race: 3600 rpm

Thrust load: 2 kgf

Atmosphere: 80° C., 5% RH a) Acoustic Durability

The acoustic durability of the ball bearing was evaluated in terms of Anderon value generally used for evaluation of acoustic characteristics of bearings. Anderon values are divided into high-frequency values (H.B.), middle-frequency values (M.B.), and low-frequency values (L.B.). Because L.B. is not so influential on the performance of a rolling bearing, H.B. and M.B. were adopted as criteria for evaluation of acoustic durability.

All the sample ball bearings were preliminarily tested, and only those having both H.B. and M.B. of not more than 1.0 in the initial stage of rotation were used for the rotation test. The Anderon values were measured every 500 hours under the above-mentioned testing conditions. The test was stopped at the time when either H.B. or M.B. increased to 3.0 or more, and the time up to this point was taken as acoustic durability.

b) Torque

Figure 5:
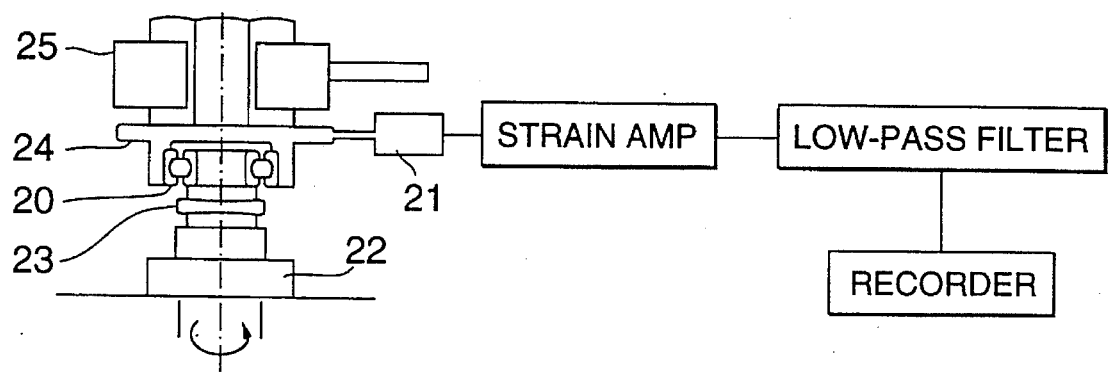
FIG. 5 is an apparatus for measuring the torque of a bearing.

The torque was measured with a bearing torque measuring apparatus schematically shown in FIG. 5. Bearing 20 was rotated at 3600 rpm, and the torque was measured with strain gauge 21 and recorded. The value measured after 10 minutes from the start of rotation, at which the torque reached a substantially steady state, was taken as an initial torque, and the value when either H.B. or M.B. Anderon value became 3.0 or more or after 6,000 hours was taken as a final torque. In FIG. 5, numerals 22 indicates air spindle; 23 arbor; 24 aluminum cap; and 25 air bearing. Bearings having an initial torque of not higher than 1.2 g.cm and a final torque of not higher than 2.0 g.cm were judged "pass".

c) Anticorrosion Test

Each sample bearing was allowed to stand in the atmosphere at 60° C. and 90% RH for 7 days. After the 7 days' standing, rust generation on the surface was observed with the naked eye. Samples with no rust observed were judged "pass". The outer and inner races and rolling members used for making the sample bearings had completely been degreased before assembly.

Example 24

A resin composition consisting of 70% of nylon 66 ("Leona 1300S" produced by Asahi Chemical Industry Co., Ltd.), 23% of low-viscosity high-density polyethylene ("Hizex 1300J" produced by Mitsui Petrochemical Industries, Ltd.), and 7% of maleic anhydride-grafted polyethylene ("Modic H-100F" produced by Mitsubishi Petrochemical Co., Ltd.) was injection molded, and the resulting molded article was impregnated with 4.8%, based on the molded article, of PAO having a kinetic viscosity of 46 mm$^2$/s at 40° C. After fitting the oil-impregnated cage into the above-described ball bearing, the cage was dipped in a 3% solution of PAO having a kinetic viscosity of 46 mm$^2$/s at 40° C. (and containing the above-described rust inhibitors; hereinafter the same) in a volatile solvent and pulled up; and the volatile solvent was allowed to evaporate. The oil coverage by the oil plating was 3 mg.

Example 25

The same molded article as prepared in Example 24 was impregnated with 0.25%, based on the molded article, of DOS having a kinetic viscosity of 12 mm$^2$/s at 40° C. After fitting the oil-impregnated cage into the above-described ball bearing, the cage was oil-plated with DOS having a kinetic viscosity of 12 mm$^2$/s at 40° C. in the same manner as in Example 24 to pick up 3 mg of the lubricating oil.

Example 26

The same molded article as prepared in Example 24 was impregnated with 0.58%, based on the molded article, of DOS having a kinetic viscosity of 12 mm$^2$/s at 40° C. After fitting the oil-impregnated cage into the above-described ball bearing, the cage was oil-plated with DOS having a kinetic viscosity of 12 mm$^2$/s at 40° C. in the same manner as in Example 24 to pick up 3 mg of the lubricating oil.

Example 27

The same molded article as prepared in Example 24 was impregnated with 1.20%, based on the molded article, of DOS having a kinetic viscosity of 12 mm$^2$/s at 40° C. After fitting the oil-impregnated cage into the above-described ball bearing, the cage was oil-plated with DOS having a kinetic viscosity of 12 mm$^2$/s at 40° C. in the same manner as in Example 24 to pick up 2 mg of the lubricating oil.

Example 28

The same molded article as prepared in Example 24 was impregnated with 4.60%, based on the molded article, of DOS having a kinetic viscosity of 12 mm$^2$/s at 40° C. After fitting the oil-impregnated cage into the above-described ball bearing, the cage was oil-plated with DOS having a kinetic viscosity of 12 mm$^2$/s at 40° C. in the same manner as in Example 24 to pick up 3 mg of the lubricating oil.

Example 29

The same molded article as prepared in Example 24 was impregnated with 6.20%, based on the molded article, of DAPE having a kinetic viscosity of 22 mm$^2$/s at 40° C. After fitting the oil-impregnated cage into the above-described ball bearing, the cage was oil-plated with DAPE having a kinetic viscosity of 22 mm$^2$/s at 40° C. in the same manner as in Example 24 to pick up 2 mg of the lubricating oil.

Comparative Example 9

The same molded article as prepared in Example 24 was impregnated with 0.07%, based on the molded article, of DOS having a kinetic viscosity of 12 mm$^2$/s at 40° C. After fitting the oil-impregnated cage into the above-described ball bearing, the cage was oil-plated with DOS having a kinetic viscosity of 12 mm$^2$/s at 40° C. in the same manner as in Example 24 to pick up 5 mg of the lubricating oil.

Comparative Example 10

The same molded article as prepared in Example 24 was impregnated with 4.60%, based on the molded article, of DOS having a kinetic viscosity of 12 mm$^2$/s at 40° C., and the resulting oil-impregnated cage was fitted into the above-described ball bearing.

Comparative Example 11

A cage obtained by injection molding of nylon 66 was fitted into the above-described ball bearing without impregnation.

Comparative Example 12

A cage obtained by injection molding of nylon 66 was fitted into the above-described ball bearing to which 15 mg of lithium soap grease had been applied.

Comparative Example 13

A resin composition consisting of 90% of nylon 66 and 10% of glass fiber was injection molded, and the resulting molded article was impregnated with 0.4%, based on the molded article, of DOS having a kinetic viscosity of 12 mm$^2$/s at 40° C. After fitting the oil-impregnated cage into the above-described ball bearing, the cage was dipped in a 3% solution of DOS having a kinetic viscosity of 12 mm$^2$/s at 40° C. in a volatile solvent and pulled up, and the volatile solvent was allowed to evaporate. The oil coverage by the oil plating was 3 mg.

TABLE 4

| Example No. | Acoustic Durability (hr) | Initial Torque (g · cm) | Final Torque (g · cm) | Anti-corrosion (pass/fail) |
|---|---|---|---|---|
| Example 24 | >6000 | 1.16 | 1.14 | pass |
| Example 25 | >6000 | 1.12 | 1.15 | pass |
| Example 26 | >6000 | 1.09 | 1.10 | pass |
| Example 27 | >6000 | 1.05 | 1.11 | pass |
| Example 28 | >6000 | 1.07 | 1.09 | pass |
| Example 29 | >6000 | 1.05 | 1.12 | pass |
| Comparative Example 9 | 3000 | 1.09 | 3.20 | pass |
| Comparative Example 10 | >6000 | 1.20 | 2.26 | slight rust generation |
| Comparative Example 11* | — | — | — | considerable rust generation |
| Comparative Example 12 | >6000 | 5.90 | 3.68 | slight rust generation |
| Comparative Example 13 | 4500 | 1.25 | 2.60 | pass |

Note:
*The rotation test was not conducted because both the H.B. and M.B. Anderon values of the sample of Comparative Example 11 were 2 or higher in the preliminary test.

As is demonstrated in Table 4, since the cage of Examples 24 to 29 maintains the lubricating oil at a high retention, the ball bearings using these cages are furnished with a lubricating oil oozed out from the respective cage for an extended period of time and therefore show satisfactory lubrication without using grease with improved lubricating properties in a high temperature. In addition, having been subjected to oil plating, the ball bearing of the present invention exhibits satisfactory torque and acoustic characteristics from the initial stage of rotation.

Further, increase in torque attributed to resistance to stirring of grease is inhibited because of use of no grease.

Table 4 also reveals that the ball bearings of Examples 24 to 29 have excellent anticorrosion even under severe conditions, i.e., high temperature and humidity.

As hereinabove described, the cage according to the present invention which is fitted into a rolling bearing is prepared by molding a resin composition comprising a heat-resistant and oil-resistant resin and a polyolefin into a molded article having the shape of a cage and impregnating the molded article with a lubricating oil by immersion and therefore retains a given amount of a lubricating oil.

Since the resin composition constituting the cage contains a polyolefin having high affinity to a lubricating oil, the resulting cage has an increased oil content at a high oil retention thereby supplying the lubricating oil to the rotating part of rolling members in a stable manner for a prolonged period of time. As a result, the torque for rotation of the rolling bearing having fitted therein the oil-impregnated cage is reduced, and the torque fluctuation is also reduced.

The heat-resistant and oil-resistant resin as a matrix resin and the polyolefin have different melt viscosities at the shear rate during injection molding. The difference in melt viscosity increases the aspect ratio of the polyolefin dispersed in the matrix resin thereby improving oil absorbing capacity. In particular, as the melt viscosity of the polyolefin becomes lower than that of the matrix resin, the ratio of occupation by the polyolefin in the surface portion of a molded article increases to impart the characteristics of the polyolefin to the surface of the molded article thereby further improving the oil absorbability.

Since a lubricating oil is given to the cage by immersion after the resin composition is once molded into the desired shape, the molded article suffers from no weld line and therefore exhibits excellent mechanical strength.

Further, the rolling bearing with the above-mentioned cage fitted is subjected to oil plating so that a given amount of a lubricating oil is uniformly adhered to all the surface of the bearing. Therefore, even when oozing of a lubricating oil from the cage is insufficient in the initial stage of rotation or at a low speed of rotation, lubrication is assured by the lubricating oil adhered to the surface of the bearing. It is possible to impart not only lubricating properties but other characteristics to the bearing by adding additives to the lubricating oil for oil plating. For example, rust generation often observed particularly with rolling bearings used in high temperatures can be prevented by using a lubricating oil containing a rust inhibitor for oil plating.

While the invention has been described in detail and with reference to specific examples thereof, it will be apparent to one skilled in the art that various changes and modifications can be made therein without departing from the spirit and scope thereof.

What is claimed is:

1. A cage for a rolling bearing obtained by molding a resin composition comprising 100 parts by weight of a heat-resistant and oil-resistant resin and from 5 to 100 parts by weight of a polyolefin into the shape of a cage and then immersing the molded article in a lubricating oil.

2. The cage for a rolling bearing of claim 1, wherein said heat-resistant and oil-resistant resin is a polyamide resin.

3. The cage for a rolling bearing of claim 1, wherein said polyolefin is at least one of polyethylene, polypropylene, poly-1-butene, poly-4-methyl-1-pentene, and a copolymer comprising monomer units composing these homopolymers.

4. The cage for a rolling bearing of claim 1, wherein said immersion is carried out so that the molded article picks up from 0.2 to 15 parts by weight of said lubricating oil per 100 parts by weight of the molded article.

5. A rolling bearing having fitted therein a cage, the cage being obtained by molding a resin composition comprising a heat-resistant and oil-resistant resin and a polyolefin into a shape of a cage and then immersing the molded article in a lubricating oil, and then having been subjected to oil plating.

* * * * *